Figure 1C:
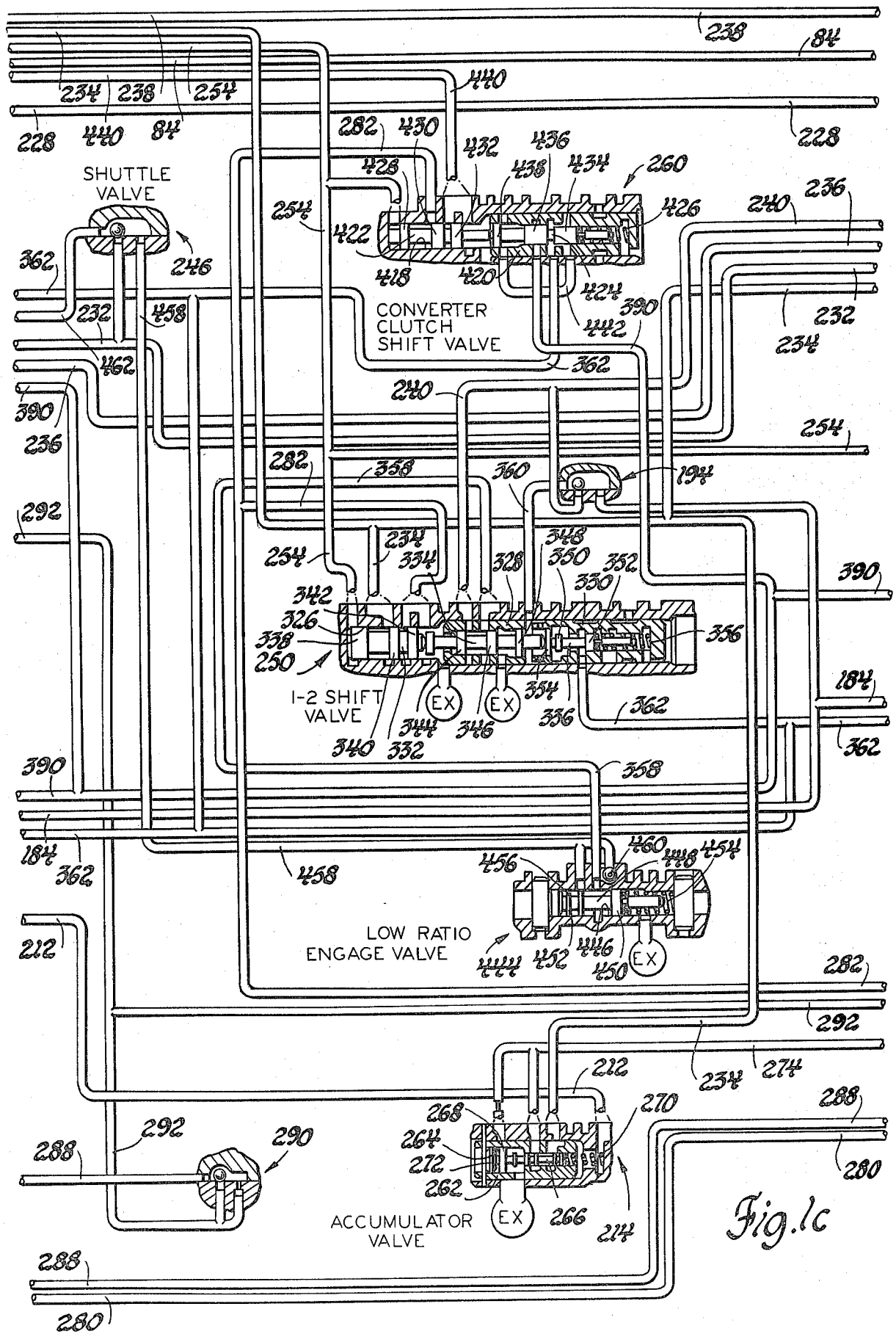

United States Patent [19]

Borman et al.

[11] 4,432,255
[45] Feb. 21, 1984

[54] HYDRAULIC CONTROL FOR A POWER TRANSMISSION

[75] Inventors: August H. Borman, Farmington; Mark A. Perlick, Brighton, both of Mich.

[73] Assignee: General Motors Corporation, Detroit, Mich.

[21] Appl. No.: 200,959

[22] Filed: Oct. 27, 1980

[51] Int. Cl.³ .............................................. B60K 41/16
[52] U.S. Cl. ....................................... 74/869; 74/868; 74/867
[58] Field of Search ........................... 74/867, 868, 869

[56] References Cited

U.S. PATENT DOCUMENTS

| | | | |
|---|---|---|---|
| 3,580,112 | 5/1971 | Dach | 74/868 |
| 3,886,819 | 6/1975 | Lentz | 74/867 |
| 4,106,369 | 8/1978 | Taga | 74/868 |

FOREIGN PATENT DOCUMENTS 2343170 9/1977 France ................................. 74/869

*Primary Examiner*—Leslie A. Braun
*Assistant Examiner*—D. Wright

*Attorney, Agent, or Firm*—Donald F. Scherer

[57] ABSTRACT

A hydraulic control for a power transmission has a regulator valve for controlling the hydraulic system pressure and a plurality of shift valves for controlling the automatic ratio change in the transmission. The shift valves are urged toward the higher ratio position by a governor pressure. The shift valves, except the 1-2 valve, are selectively subjected to separate modulated throttle valve pressures acting in opposition to the governor pressure and depending upon whether the respective shift valve is in the lower or higher ratio position. The modulated pressures are maintained at substantially zero for a portion of the throttle valve pressure range so that upshifting and downshifting will be sensitive to governor pressure and therefore vehicle speed only.

The regulator valve is subject to a variable bias pressure which is proportional to throttle valve pressure. The bias pressure is controlled by a valve to be equal to the throttle pressure during the lower pressure portion of the throttle pressure range and to increase at a rate less than the throttle valve pressure during the remainder of the pressure range.

1 Claim, 5 Drawing Figures

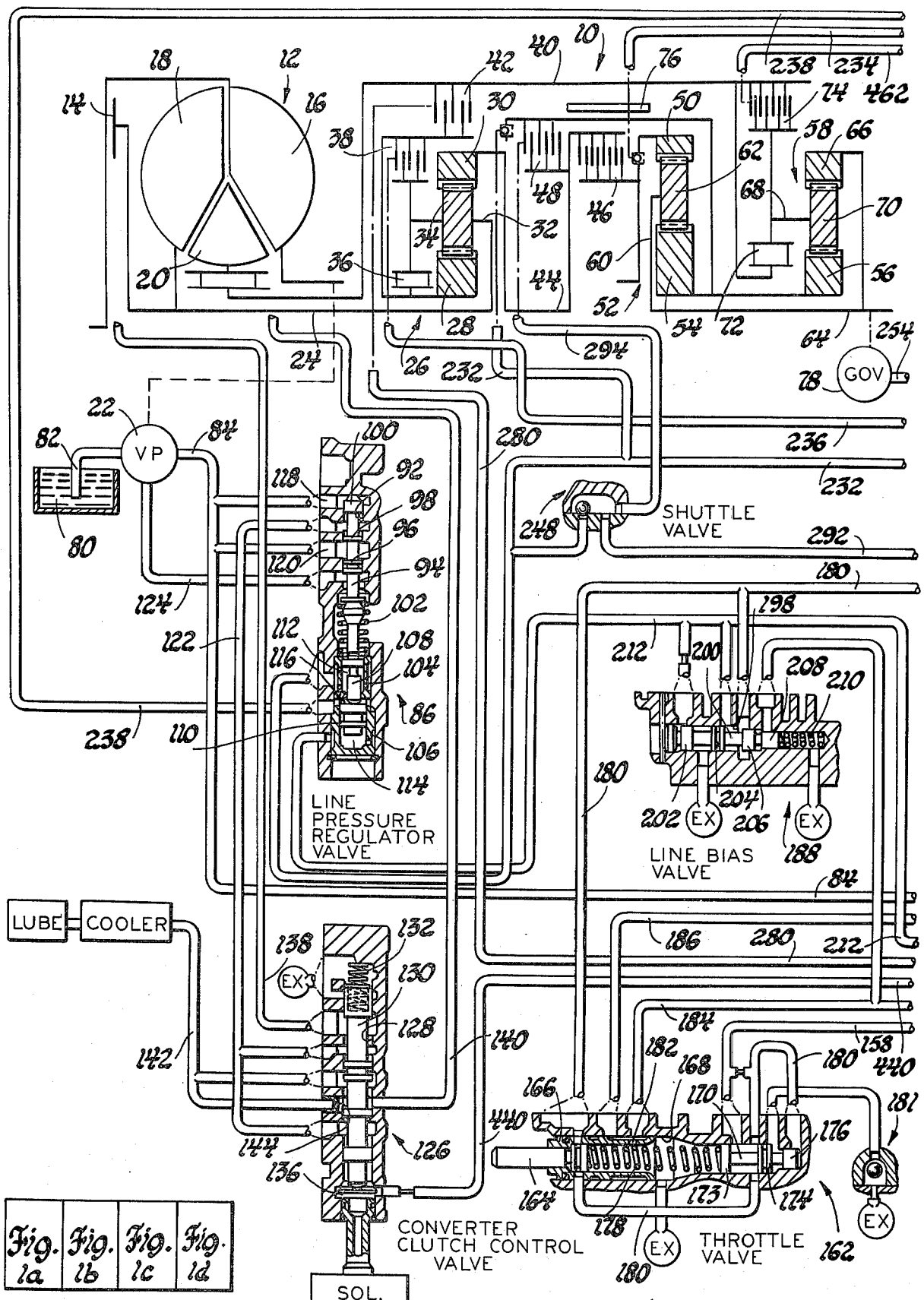

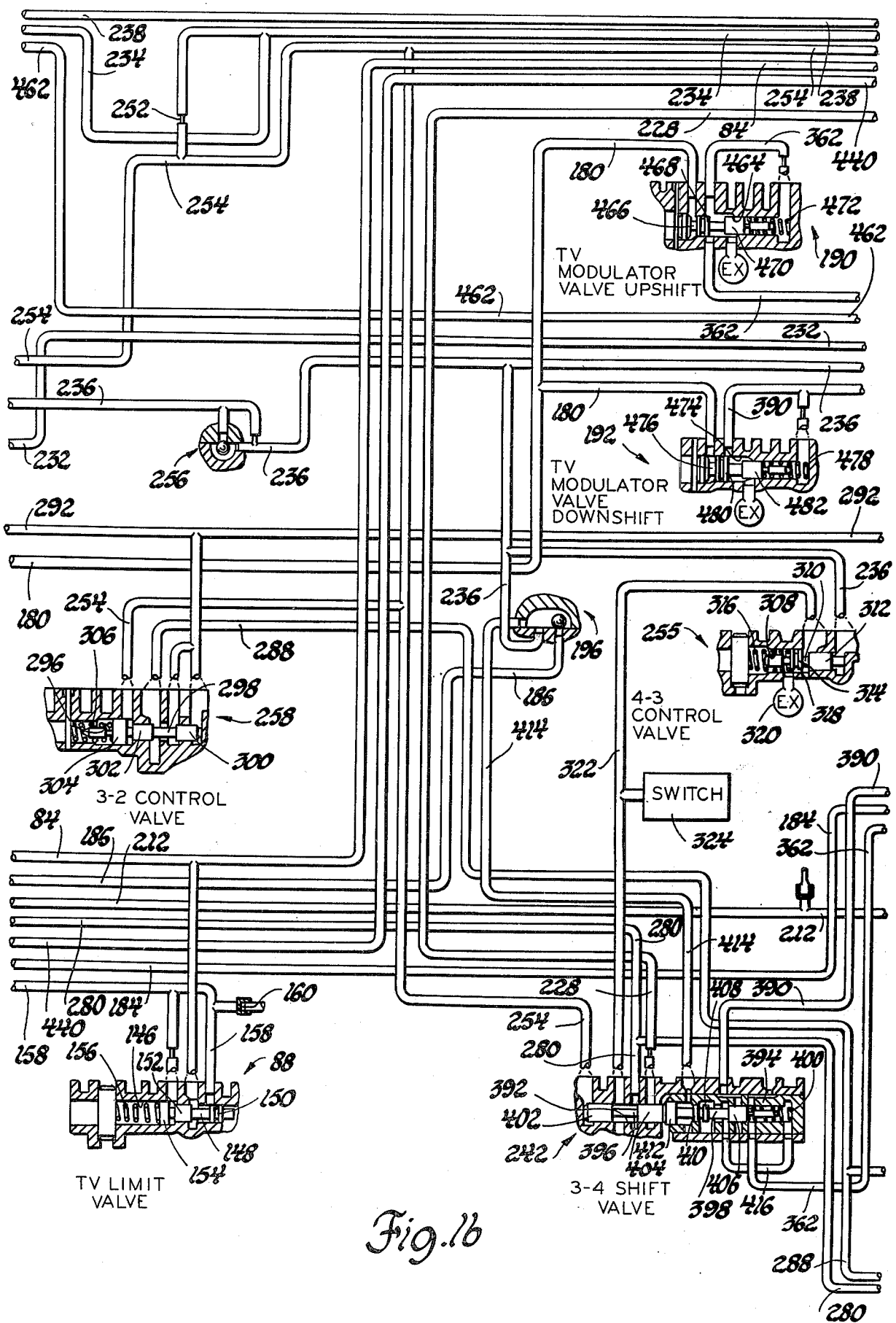

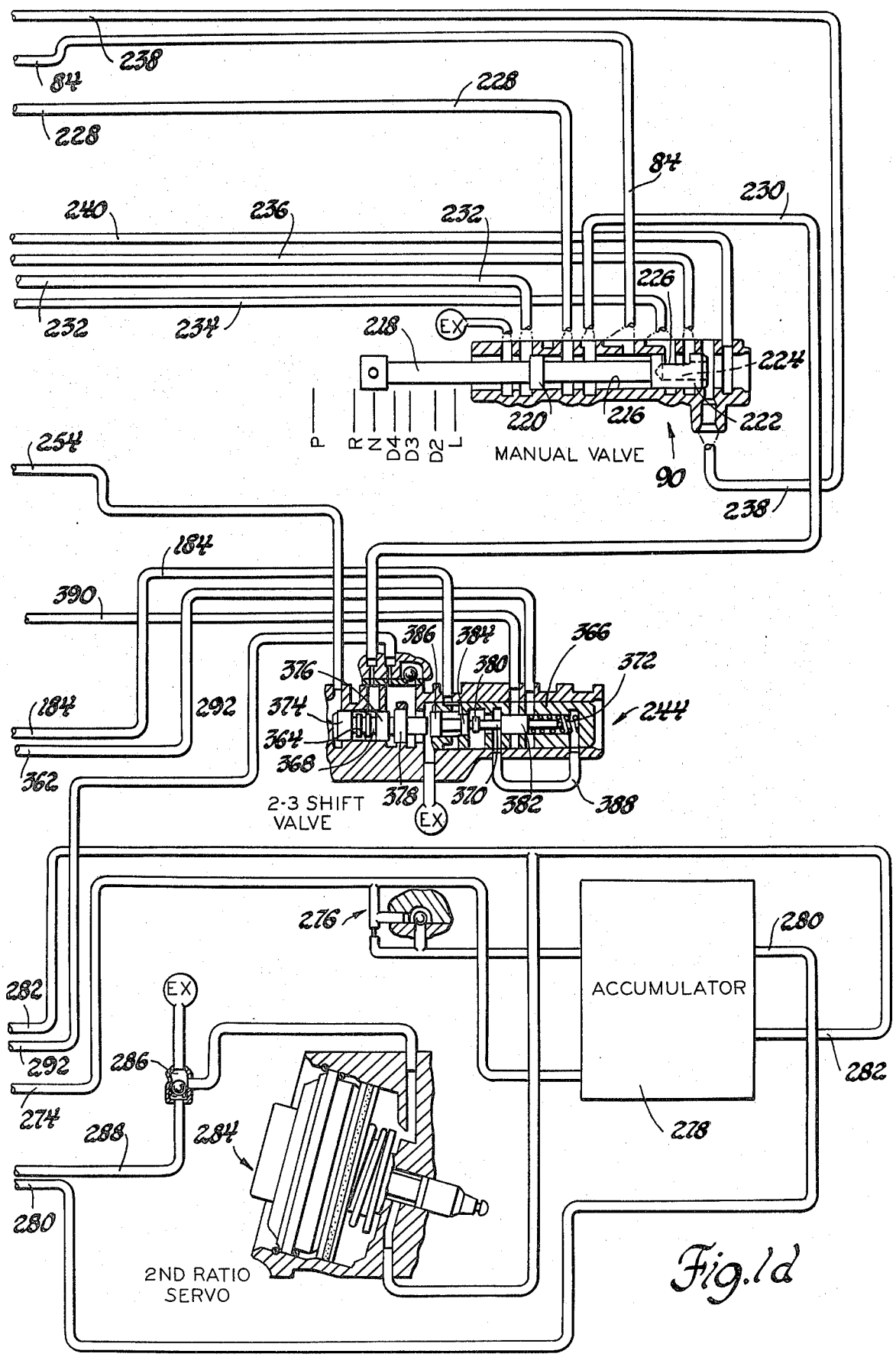

HYDRAULIC CONTROL FOR A POWER TRANSMISSION

This invention relates to hydraulic controls and more particularly to hydraulic control systems for controlling the ratio change and pressure levels for an automatic shifting power transmission.

It is an object of this invention to provide an improved hydraulic control for a power transmission having a controlled system pressure and shift valves subject to separate modulated pressures depending upon the operating condition of the shift valve.

It is another object of this invention to provide an improved hydraulic control for a power transmission having a shift valve which is urged to the higher speed ratio condition by a pressure proportional to vehicle speed and toward the lower speed ratio condition by a pressure which is proportional to engine throttle position when the throttle position is opened more than a predetermined amount such that positioning the shift valve in the higher ratio condition is determined by vehicle speed only during a portion of the operating range.

It is a further object of this invention to provide an improved hydraulic control for a power transmission having a shift valve for controlling the interchange of drive ratios wherein the shift valve is biased toward the higher ratio by a pressure proportional to vehicle speed and toward the lower ratio by both a spring and respective ones of throttle position proportional pressures which are controlled by a pair of control valves such that below respective throttle positions the control pressure is nonexistent thereby providing speed responsive upshifts only during operation in this throttle range.

These and other objects and advantages of the present invention will be more apparent from the following description and drawings in which:

FIG. 1 is a block diagram showing a respective location of FIGS. 1a, 1b, 1c and 1d; and FIGS. 1a through 1d are a schematic and diagrammatic representation of an automatic power transmission and hydraulic control system.

Referring to the drawing, there is seen in FIG. 1, a power transmission, generally designated 10, having a conventional torque converter 12 and a torque converter clutch 14. The torque converter clutch 14 may be constructed in accordance with U.S. Pat. No. 3,252,352 issued to General et al. May 24, 1966. The torque converter 12 has an impeller 16 driven by an engine, not shown, a turbine 18 and a stator 20. The impeller 16 is coupled to drive a conventional variable displacement control pump 22. The turbine 18 and torque converter clutch 14 are drivingly connected to a shaft 24 which is coupled with an overdrive planetary gear set, generally designated 26.

The planetary gear set 26 includes a sun gear 28, a ring gear 30, a carrier 32 and a plurality of pinion gears 34 rotatably mounted on the carrier 32 and meshing with the sun gear 28 and ring gear 30. The carrier 32 is drivingly connected to the shaft 24. The sun gear 28 is selectively drivingly connected with the carrier 32 through a conventional one-way clutch 36 and a selectively engageable fluid-operated friction clutch 38.

The sun gear 28 is also selectively connectable with the transmission housing 40 through a selectively engageable fluid-operated friction brake 42. The ring gear 30 is drivingly connected to a shaft 44 which provides an input member for a pair of fluid-operated friction clutches 46 and 48, respectively. When the brake 42 is engaged, planetary gear set 26 is conditioned for an overdrive ratio and when either clutch 38 or one-way clutch 36 are engaged, planetary gear set 26 is conditioned for a direct drive ratio.

The clutch 46 is drivingly connected to a ring gear 50 which is a member of a planetary gear set 52. The clutch 48 is drivingly connected to a sun gear 54 of planetary gear set 52 and a sun gear 56 of a planetary gear set 58. The planetary gear set 52 also includes a carrier 60 upon which is rotatably mounted a plurality of pinion gears 62 in meshing relationship with ring gear 50 and sun gear 54. The carrier 60 is drivingly connected to a transmission output shaft 64. The planetary gear set 58 includes a ring gear 66, a carrier 68 and a plurality of pinion gears 70 which are rotatably mounted on the carrier 68 and mesh with the sun gear 56 and ring gear 66. The ring gear 66 is drivingly connected to the output shaft 64, while the carrier 68 is selectively connectable with the transmission housing 40 by a conventional one-way brake 72 or a fluid-operated friction brake 74. The sun gears 54 and 56 are interconnected and are selectively controlled by a fluid-operated friction band brake 76. The planetary gearing arrangement, including planetary gear sets 26, 52 and 58, are selectively operable to provide four forward speeds and a reverse speed. The highest initial forward speed is an overdrive ratio. A more complete description of the planetary gearing arrangement and the operation thereof, can be found in U.S. Pat. No. 3,724,292 issued to Borman Apr. 3, 1973.

The transmission described in the Borman patent also includes a one-way brake device in parallel with the band brake 76. Such a device is not necessary for the operation of the transmission, however, it could be utilized with the present invention and those skilled in the art can make that inclusion.

The output shaft 64 is drivingly connected to a hydraulic governor 78 which may be constructed in accordance with U.S. Pat. No. 3,559,667 issued to Koivunen Feb. 2, 1971.

The hydraulic control pump 22 draws oil from a transmission sump 80 through a passage 82 and delivers the fluid to a main line pressure passage 84 which is connected to a line pressure regulator valve 86, shown in FIG. 1a, a TV limit valve 88, shown in FIG. 1b, and a manual shift valve 90, shown in FIG. 1d.

The line pressure regulator valve 86 includes a valve bore 92 in which is slidably disposed a valve spool 94 having three equal diameter spaced lands 96, 98 and 100. The valve spool 94 is urged upward, as seen in FIG. 1a, by a spring 102. The regulator valve 86 also includes a bias portion having a pair of sleeves 104 and 106 in which are slidably disposed valve spools 108 and 110, respectively. The valve spool 108 cooperates with sleeve 104 to form a reverse bias chamber 112, while the valve spool 110 cooperates with the closed end of sleeve 106 to provide a TV bias chamber 114. The space between valve spools 110 and 108 provides a pressure bias chamber 116. The line pressure passage 84 is connected to the regulator valve 86 at ports 118 and 120, respectively. A converter feed passage 122 is connected to the regulator valve 86 between lands 98 and 100. When fluid pressure in passage 84 acting on land 98 reaches its regulated value, the port 120 is opened to passage 122. The regulator valve 86 is also connected to a pump displacement decrease passage 124 which is in fluid communication with the capacity control mechanism for the pump 22. When the regulator valve 86 is opened sufficiently to connect port 120 with passage 124, the pump displacement will be reduced. When passage 124 is pressurized, pump flow and pressure are maintained so that the control system is filled with oil.

The converter feed passage 122 is connected to a solenoid-operated converter clutch valve 126 which includes a valve bore 128 and a valve spool 130 slidably disposed therein. The valve spool 130 is urged downward in the valve bore 128 by a coil spring 132. The valve spool 130 cooperates with the valve bore 128 and a solenoid valve 134 to form a pressure control chamber 136. The pressure control chamber 136 can be selectively pressurized by energizing solenoid 134 such that the valve spool 130 will move upward against the spring 132. In the spring set position shown, the valve spool 130 directs fluid pressure from passage 122 to a converter clutch release passage 138, while fluid pressure is returned from the torque converter 12 through a converter clutch apply passage 140. Fluid in the apply passage 140 returning from the torque converter 12, is directed through a passage 142 which is connected to a conventional cooler and then distributed to the lubrication circuit for the transmission.

In the pressure set position of valve spool 130, fluid pressure from passage 122 is delivered to the clutch apply passage 140 and any flow from the torque converter is exhausted via release passage 138. The operation of the converter clutch 14 on flow reversal is disclosed in the above-mentioned patent to General et al. In the pressure set position of valve spool 130, a small portion of fluid is delivered through passage 142 to the cooler and lubrication circuit via a restriction 144.

The TV limit valve 88 includes a stepped valve bore 146 in which is slidably disposed a valve spool 148 having spaced equal diameter lands 150 and 152, and a larger land 154. The valve spool 148 is urged toward the right, as viewed in FIG. 1b, by a spring 156. Fluid pressure enters the valve from line passage 84 between lands 150 and 152 and exits through a TV feed passage 158. The TV feed passage 158 is also in fluid communication with the valve spool 148 at the differential area formed by lands 152 and 154. When the fluid pressure operating on this differential area is high enough to overcome the force in spring 156, the valve spool 148 will move to the left thereby discontinuing unrestricted fluid flow from passage 84 to passage 158. The continuous flow from passage 84 to passage 158 will be sufficient to satisfy a small restriction 160 and the requirements of a throttle valve 162 which is connected with passage 158.

The throttle valve 162 is substantially identical to the throttle valve disclosed in U.S. Pat. No. 3,893,472 issued to Schuster July 8, 1975. The throttle valve 162 includes a manual plunger 164 slidably disposed in a sleeve 166 which is fixed in a valve bore 168. Slidably disposed in the valve bore 168 is a valve spool 170 which has a pair of equal diameter lands 173 and 174 and a smaller diameter land 176. The manual plunger 164 is operatively connected to the valve spool 170 by a compression spring 178, such that increased rightward movement of plunger 164 will result in increased spring force acting on valve spool 170. The valve spool 170 is operable to provide fluid communication between the TV feed passage 158 and a throttle valve pressure (TV) passage 180. The TV passage 180 is also connected to the end of land 176, and the differential area formed on the manual plunger 164. The fluid pressure in passage 180 urges the valve spool 170 leftward against the force in spring 178 until the valve spool 170 is operable to restrict the fluid flow between passages 158 and 180 and thereby control the fluid pressure in passage 180 in proportion to the manual input provided on plunger 164. Excess fluid volume is exhausted through a TV exhaust control 181 similar to that described in the aforementioned Schuster patent.

The manual input on plunger 164 is proportional to the amount of throttle opening set by the vehicle operator through a conventional accelerator pedal. Therefore, the fluid pressure in passage 180 is proportional to throttle position or throttle opening or, as it is sometimes termed, torque demand. If the manual plunger 164 is moved sufficiently to the right, a port 182 in sleeve 166 is opened to distribute the fluid pressure in passage 180 to a detent passage 184 and a part throttle passage 186. The TV passage 180 is connected to a line bias valve 188, a TV modulator valve 190 and another TV modulator valve 192. The detent pressure passage 184 is connected to the line bias valve 188 and a shuttle valve 194, shown in FIG. 1c. The part throttle pressure passage 186 is connected to a shuttle valve 196, shown in FIG. 1b.

The line bias valve 188 includes a stepped valve bore 198 in which is slidably disposed a valve spool 200 having a pair of spaced equal diameter lands 202 and 204, a smaller diameter land 206 and an even smaller diameter land 208. The valve spool 200 is urged to the left, as viewed in FIG. 1a, by a compression spring 210 acting between the end of valve bore 198 and land 208. The fluid pressure in TV passage 180 is connected between lands 206 and 204 to a modulated TV passage (MTV) 212. The fluid pressure in MTV passage 212 operates on the end of valve land 202 to urge the valve spool 200 rightward against spring 210. The area of land 202 is designed such that the pressure in TV passage 180 and therefore MTV passage 212 will be equal for a predetermined amount of the throttle pressure range before the valve spool 200 begins to move against spring 210.

When the fluid pressure in passage 212 is sufficient to move the valve spool 200 to the right, unrestricted communication between passages 180 and 212 is prevented such that the fluid pressure acting on the differential area between valve lands 204 and 206 and the spring 210 will counteract the pressure operating on valve land 202. During this operating condition, the pressure in passage 180 must increase significantly more than the pressure in passage 212 so that the force balance on spool 200 will be maintained. Thus, through this portion of the throttle valve pressure range, the modified TV pressure in passage 212 will increase at a slower rate than TV pressure in passage 180. The TV passage 212 is connected to the bias chamber 114 on regulator valve 86 and to an accumulator valve 214. The bias pressure in chamber 114 affects the system pressure established by the regulator valve 86 such that, as the pressure in passage 212 increases, line pressure increases proportionally.

When the line pressure bias valve 188 being inoperable through the lower portion of throttle opening, line pressure will increase in direct proportion to throttle pressure increase. However, when the line bias valve 188 begins to regulate the pressure in MTV passage 212, the line pressure in passage 84 will increase proportionally to be at a slower rate than the increases in throttle pressure. It is believed that this type of line pressure regulation is more closely related to engine torque development and provides more accurate fluid pressure levels for the fluid-operated clutches and brakes resulting in improved transmission efficiency.

The manual valve 90 is similar in design to conventional manual shift valves normally found in automatic shifting power transmissions. The manual valve 90 is operable to provide four forward speed operating conditions, a neutral condition, a reverse condition and a park condition. The manual valve 90 includes a valve bore 216 in which is slidably disposed a valve spool 218 having a pair of equal diameter spaced lands 220 and 222. The land 222 has an axial passage 224 which is open to the right end of bore 216 and a radial opening 226 which is open to passage 224. The valve spool 218, as seen in FIG. 1d, is in the neutral (N) position. It is selectively movable by the operator to a park (P) position, reverse (R) position, automatic four-speed drive (D4) position, automatic three-speed drive (D3) position and automatic two-speed drive (D2) position, and a low speed (L) position. The purpose of the manual valve 90 is to selectively distribute fluid pressure in line pressure passage 84 to a plurality of passages which are connected with various operating components in the transmission control.

In the (N) position shown, passage 84 is connected between lands 220 and 222 with RND4 passage 228 and RND4D3 passage 230. As will be evident from the following, the passage 228 is opened to main line passage 84 in R, N and D4 positions while passage 230 will be opened to line passage 84 in the N, R, D4 and D3 positions. When the valve spool 218 is moved to the (R) position, line passage 84 is connected to passages 228 and 230 and also to a reverse passage 232. In the park (P) position, line passage 84 is closed by valve land 222 and all other passages are connected to exhaust.

In the D4 position, line passage 84 is connected to passages 228, 230 and a D4 passage 234. In the D3 position, line passage 84 is connected to passage 230, passage 234 and a D3 passage 236. In the D2 position, line passage 84 is connected to passages 234, 236 and a D2 bias passage 238. In the (L) position, line passage 84 is connected to passages 234, 236, 238 and a low signal passage 240. The passage 228 is connected to a 3-4 shift valve 242. The passage 230 is connected to a 2-3 shift valve 244. The passage 232 is connected to a shuttle valve 246, a shuttle valve 248, clutch 48 and the reverse bias chamber 112 on the regulator valve 86. Thus, in a reverse drive, the regulator valve 86 is subjected to a bias pressure from the manual valve 90 and also from the line bias valve 188. Passage 234 is connected to the accumulator valve 214, a 1-2 shift valve 250, the clutch 46 and through a restriction 252 to a governor passage 254. Since the governor 78 is a bleed type governor, a restricted feed will provide sufficient input flow to permit proper operation in establishment of a vehicle speed responsive pressure in passage 254.

Passage 236 is connected to the shuttle valve 196, a 4-3 control valve 255 and, through a ball check and restriction assembly 256, to clutch 38. The passage 238 is connected to bias chamber 116 on the regulator valve 86 such that during a D2 operation, a pressure output of regulator valve 86 is constant, as the pressure in passage 238 is the only effective bias operating on the regulator valve 86. The assembly 256 provides a slow feed-fast exhaust control for clutch 38.

Passage 240 is connected to the 1-2 shift valve 250. The governor pressure passage 254 is connected to the 1-2 shift valve 250, the 2-3 shift valve 244, the 3-4 shift valve 242, a 3-2 control valve 258 and a converter clutch shift valve 260.

The accumulator valve 214 includes a sleeve 262 having a stepped bore 264 formed therein. A valve spool 266 having a plurality of spaced equal diameter lands formed thereon is slidably disposed in a portion of the bore 264. A plug 268 is slidably disposed in the larger diameter of bore 264 and is maintained in abutment with valve spool 266 by a compression spring 270. The end of valve bore 264 adjacent plug 268 is closed by a closure member 272 which is secured in the bore 264. In the alternative, the plug 268 can be formed integrally with the valve spool 266, however, the separate members are generally preferred from a production standpoint.

The valve bore 264 is in fluid communication with passage 234, an accumulator passage 274 and the MTV passage 212. The fluid pressure in the MTV passage assists the spring 270 and biases the valve spool 266 and plug 268 to the left, as viewed in FIG. 1c. Fluid pressure is directed by the valve spool 266 from passage 234 to passage 274. Fluid pressure in passage 274 is directed to the space between plug 268 and closure member 272 to urge the valve spool 266 to the right against the spring 270 and the pressure provided by passage 212. The fluid pressure in passage 274 operates on the much larger area of plug 268 such that the valve spool 266 will move rightward preventing further fluid communication between passages 234 and 274, thus limiting the pressure in passage 274.

Since the pressure in passage 212 is generated by the line bias valve 188, the pressure therein will vary according to the description given above. Thus, the pressure in passage 274 will vary in proportion to the bias pressure. The passage 274 is connected with a conventional dual piston accumulator 278 in a manner to provide a bias pressure for each of the pistons. One of the accumulator pistons is supplied directly while the other is supplied by a ball check and restrictor passage 276. The ball check and restrictor 276 provides for a slow pressure buildup and a fast release. The portion of passage 274 having the slow pressure rise provides a bias pressure for the piston in the accumulator 278, the other side of which is connected to a fourth ratio brake engage passage 280. The pressure bias side of the other piston in accumulator 278 is connected with the unrestricted portion of passage 274, and the accumulator portion is connected to a second ratio brake engage passage 282. The passage 280 is connected with the 3-4 shift valve 242 and to the apply piston of brake 42. The passage 282 is in fluid communication with the 1-2 shift valve 250, the converter clutch shift valve 260 and a second ratio apply servo 284.

The second ratio apply servo 284 may be constructed in accordance with that shown in U.S. Pat. No. 3,896,685 issued to Shellman July 20, 1975. The second ratio engage servo 284 also provides an accumulator volume used during the establishment of the third forward drive ratio and is accordingly connected through a ball check 286 with a third ratio accumulator passage 288.

The third ratio accumulator passage 288 is connected through a ball check and restrictor 290 with a third ratio feed passage 292 and with the 3-2 control valve 258. The third ratio feed passage 292 is in fluid communication with the 2-3 shift valve 244, the 3-2 control valve 258 and the shuttle valve 248. The shuttle valve 248 is connected with a third ratio engage passage 294.

As pointed out above, the shuttle valve 248 is also connected with the reverse passage 232 such that when either the reverse passage 232 or the passage 292 are pressurized, the clutch 48 will be engaged. The clutch 48 is preferably a dual area clutch such that the total clutch capacity can be utilized in reverse gear and only a portion of the clutch capacity is utilized in the third ratio. Such clutch structures are well-known.

The second ratio servo 284 is operable to engage the band brake 76 whenever passage 282 is pressurized and passage 288 is connected to exhaust. Thus, a "wash-out" shift from second to third is accomplished since the pressure necessary to engage the third ratio is operable to disengage the second ratio. Such "wash-out" shifts are well-known in the art.

The 3-2 control valve 258 includes a stepped valve bore 296 in which is slidably disposed a valve spool 298 having a pair of equal diameter spaced lands 300 and 302, and a larger diameter land 304. The valve spool 298 is urged rightward in bore 296 by a spring 306. The right end of valve spool 298 adjacent land 300 is in fluid communication with the fluid pressure in passage 292. The space between lands 300 and 302 provides communication between passages 288 and 292 when the valve spool is in the spring set position shown. The differential area formed between lands 302 and 304 is in fluid communication with the fluid pressure in the governor passage 254. When the fluid pressure in passage 292 plus the fluid pressure in governor passage 254 is sufficient, the valve spool 298 will move leftward discontinuing unrestricted fluid communication from passage 292 to passage 288. However, restricted communication between these passages will be maintained by the ball check and restrictor 290.

The 3-2 control valve is speed-sensitive due to the governor pressure, therefore, during high speed downshifts from third ratio to second ratio, the accumulator passage 288 will exhaust at a slower rate than the third ratio pressure in passage 292, thus delaying the downshift. This downshift delay will permit the engine speed to increase, thus more closely matching the desired input/output speed ratio when the second ratio is established by the servo 284. When the second ratio is established, the check valve 286 will be operable to prevent leakage fluid from building up in the accumulator side which would reduce the force availble on the band brake 76.

The 4-3 control valve 255 includes a stepped diameter bore 308 in which is slidably disposed a valve spool 310 having spaced lands 312 and 314, of which land 314 is the larger diameter land. The valve spool 310 is urged rightward in bore 308 by a spring 316. The valve land 314 has a flat portion 318 formed thereon, which flat portion 318 provides restricted fluid communication between an exhaust passage 320 and the space between lands 314 and 312. The end of tvalve bore 308 and therefore valve land 312 is in fluid communication with the D3 passage 236. The space between lands 312 and 314 is in fluid communication through a 3-4 exhaust passage 322 with the 3-4 shift valve 242. The 3-4 exhaust passage 322 is also in fluid communication with a pressure operated electrical switch 324 which is operable to control the solenoid 134 to provide disengagement of the converter clutch 14. The passage 322 is operable to exhaust the fluid in fourth ratio engage passage 280 whenever the 3-4 shift valve 242 is moved from the upshifted to the downshifted position.

The fluid pressure in passage 322 will decay rapidly until the fluid pressure in passage 322 is not sufficient to maintain the valve spool 310 in a position permitting unrestricted exhausting. This pressure level is determined by the requirements of brake 42 such that the controlled pressure level in passage 322 allows slipping of brake 42 prior to one-way clutch 36 being activated. However, this pressure level is above the level required to actuate switch 324. Thus, on a 4-3 downshift, the converter clutch 14 will be momentarily disengaged. A control mechanism substantially similar to the 4-3 control valve is described in U.S. Ser. No. 94,692, filed Nov. 16, 1979 in the name of Duhaime, and assigned to the assignee of the present invention.

Whenever fluid pressure is available in D3 passage 236, the valve spool 310 will be held leftward against spring 316, such that unrestricted exhaust of passage 322 will be available. Thus, on a forced manual downshift from D4 to D3, the converter clutch will remain engaged.

The 1-2 shift valve 250 includes a stepped valve bore 326, a pair of sleeve members 328 and 330 and three valve spools 332, 334 and 336, respectively slidably disposed in the valve bore 326 and sleeves 328 and 330. The valve spool 332 has two equal diameter spaced lands 338 and 340, and a larger diameter land 342. The valve spool 334 has three spaced lands 344, and 346 and 348 of unequal diameters, with 344 being the smaller. The valve spool 336 has a pair of spaced equal diameter lands 350 and 352 and a larger diameter land 354.

The end of land 352 is engaged by a compression spring 356 which urges the three valve spools 332, 334 and 336 leftward, as viewed in FIG. 1c. The left end of valve land 338 is connected with the governor passage 254. In the spring set position shown, the D4 passage 234 is connected to the space between lands 338 and 340. The second ratio engage passage 282 is connected to the space between lands 340 and 342 and also to an exhaust passage disposed at the space between spools 332 and 334. The space between lands 344 and 346 is in fluid communication with the low signal passage 240 and also with a passage 358. The space between lands 346 and 348 is in fluid communication with an exhaust passage. The space between valve spools 334 and 336 is in fluid communication with a feed passage 360 connected to the shuttle valve 194 which is alternately fed by the low signal passage 240 or the detent passage 184. When neither of these passages 240 or 184 is pressurized, the feed passage 360 will be connected to exhaust.

The space between lands 350 and 352 is in fluid communication with a modulated TV upshift bias passage (MTV Up) 362. The MTV Up passage 362 is connected to the 2-3 shift valve 244, the 3-4 shift valve 242 and the converter clutch shift valve 260. The pressure in the MTV Up passage 362 originates at the TV modulator valve 190. The pressure in passage 362 operates on the differential area formed between lands 354 and 352. When the governor pressure in passage 254 is sufficient to overcome the bias pressure in passage 362 and the force in spring 356, the 1-2 shift valve 250 will be upshifted such that fluid pressure in passage 232 will be directed between lands 338 and 340 to the second ratio engage passage 282.

When the 1-2 shift valve 250 is in the upshifted position, the differential area between lands 340 and 342 and line pressure will provide a hysteresis force to maintain the upshifted position in a well-known manner. The land 350 will slidably engage the bore in sleeve 330, thus preventing the bias pressure in passage 362 from operating on the differential area between lands 352 and 354 so that the downshift bias is effectively eliminated. Thus, all normal downshifts from second to first will be speed-controlled downshifts since the throttle pressure bias in passage 362 will be eliminated. However, downshift bias can be introduced from the detent passage 184 through shuttle valve 194 or from the low signal passage 240 through the manual valve 90.

The 2-3 shift valve 244 includes a stepped valve bore 364, a sleeve member 366, a pair of valve spools 368 and 370 slidably disposed in bore 364 and sleeve 366, respectively, and a valve spring 372 which urges the valve spools 370 and 368 leftward, as viewed in FIG. 1d. The valve spool 368 has a pair of spaced equal diameter lands 374 and 376 and a larger diameter land 378. The valve spool 370 has a pair of spaced equal diameter lands 380 and 382, a larger diameter land 384 and a still larger diameter land 386. The end of land 374 is in fluid communication with the pressure in governor passage 254. In the spring set position, the space between lands 374 and 376 is connected to passage 230. The spaces between lands 376 and 378 and between valve spools 370 and 368 are connected with a third ratio feed passage 292 and exhaust. The differential area between lands 384 and 386 is connected with the detent passage 184. The space between lands 382 and 380 is connected with the end of land 382 by a passage 388. The MTV Up passage 362 is in fluid communication with the end of land 382 and therefore through passage 388 with the differential area between lands 382 and 384.

When the fluid pressure in the governor passage 254 is sufficient to overcome the force in spring 372 and the bias pressure in MTV Up passage 362, the 2-3 shift valve 244 will be upshifted such that both valve spool 368 and 370 will be moved rightward. In the upshifted position, the land 378 will seal in the valve bore 364 to prevent exhausting of the space between lands 376 and 378. The passage 230 will be connected to the third ratio feed passage 292 and the pressure therein will be operable on the differential area between lands 378 and 374 to provide an upshift bias. The MTV Up passage 362 will be closed by the valve land 382 and the valve land 380 will seal the space between lands 380 and 382 from valve land 384. Substantially simultaneously with the closing of MTV Up passage 362, a modulated TV downshift pressure passage 390 (MTV DWN) will be opened by land 382. The bias pressure in MTV DWN 390, however, operates only on the end of valve spool 370 as it is closed from the differential area between land 382 and 384 by land 380. As will be explained later, the pressure in the MTV DWN passage 390 throughout most of the operating range is less than the pressure in the MTV Up passage 362. Thus, on pressure level alone, there will be some hysteresis effect, but there will also be additional hysteresis effect since the areas on which these pressures are operable are different.

The 3-4 shift valve 242 includes a stepped diameter valve bore 392, a sleeve member 394 and a pair of valve spools 396 and 398 slidably disposed respectively in the bore 392 and sleeve 394. The spring member 400 urges the valve spools 396 and 398 leftward, as viewed in FIG. 1b. The valve spool 396 has a pair of spaced unequal diameter lands 402 and 404, with diameter 404 being the larger. The valve spool 398 has spaced equal diameter lands 406 and 408, a larger diameter land 410 and a still larger diameter land 412.

In the spring set position shown, the end of valve land 402 is in fluid communication with the pressure in governor passage 254. The space between lands 402 and 404 is in fluid communication with the fourth ratio engage passage 280 and the 3-4 exhaust passage 322. The RND4 passage 228 is closed by land 404. The differential area between lands 410 and 412 is in fluid communication with the feed passage 414 which is in fluid communication with the shuttle valve 196. Thus, the passage 414 can be selectively pressurized by part throttle passage 186 or D3 passage 236, or be connected to exhaust when neither of these passages are pressurized. The space between lands 406 and 408 is connected with the end of land 406 by a feed passage 416. The end of land 406 is in fluid communication with the MTV Up passage 362. The MTV DWN passage 390 is blocked at land 406. Thus, in the spring set position, the 3-4, shift valve is inhibited from upshifting by the spring 400 and the pressure bias supplied from MTV Up passage 362. This bias pressure is operable on the end of land 406 and the differential area between lands 406 and 410. When the pressure in governor passage 254 is sufficient to overcome the force in spring 400 and the pressure bias supplied through MTV Up passage 262, the 3-4 upshift valve will be upshifted such that the valve spools 396 and 398 will be moved rightward. In the upshifted position, the valve land 402 will close the 3-4 exhaust passage 322 while fluid communication is opened between RND4 passage 228 and fourth ratio engage passage 280.

The pressure bias in MTV Up passage 362 will be blocked by land 406 and the land 408 will seal in the sleeve 394. The pressure in MTV DWN passage 390 will be communicated between lands 406 and 408 to feed passage 416 and therefore the end of land 406. Thus, in normal operation, the only pressure bias available to downshift the 3-4 valve 242 will be the pressure of MTV DWN passage 290 operating on valve land 406. A park throttle downshift pressure bias or a manual downshift pressure bias can be provided through shuttle valve 196 and passage 414 from the throttle valve 162 or the manual valve 90, respectively.

The converter clutch shift valve 260 includes a stepped diameter bore 418, a sleeve 420, a valve spool 422 slidably disposed in bore 418, and a valve spool 424 slidably disposed in sleeve 420. The valve spools 422 and 424 are urged leftward, when viewed in FIG. 1c, by a spring 426. The valve spool 422 has a pair of spaced equal diameter lands 428 and 430 and a larger diameter land 432. The valve spool 424 has three unequal diameter lands 434, 436 and 438 which increase in size from 434 to 438.

In the spring set or downshifted position shown, the end of land 428 is in fluid communication with the pressure of governor passage 254. The space between lands 428 and 430 is in fluid communication with the second ratio engage passage 282. The space between land 430 and 432 is in fluid communication with a converter clutch signal passage 440 which is also connected through the pressure control chamber 136 on the converter clutch control valve 126. The space between lands 438 and 436 is in fluid communication with a feed passage 442. The space between lands 436 and 434 is in fluid communication with the MTV Up passage 362. The fluid pressure in the MTV Up passage 362 can also flow pst land 434 to feed passage 442. The MTV DWN passage 390 is closed by land 436. Thus, the converter clutch shift valve 260 is maintained in the donwshifted position by the spring 426 and the pressure in passage 362 operating on the differential area between lands 434 and 436 and the differential area between lands 436 and 438.

When governor pressure in passage 254 is sufficient to upshift the converter clutch shift valve 260, the passage 362 will be closed by land 436 while the passage 390 will be open between lands 436 and 438 to operate on the differential area therebetween. In the upshifted position, the valve land 438 will open the feed passage 442 to exhaust, such that the differential area operated on by the pressure in MTV DWN passage 390 is less than the area operated on by the pressure in MTV Up passage 362. Also, in the upshifted position, valve land 432 will seal valve bore 418 and provide an upshift hysteresis due to the differential area available. It should be noted that the converter clutch signal passage 440 will not be pressurized unless the second ratio engage passage 282 has been pressurized. Thus, the converter clutch cannot be engaged during first ratio operation.

The passage 358 is pressurized through the 1-2 shift valve from the low signal passage 240 when the manual valve 90 is in the (L) position. The passage 358 is in fluid communication with a low ratio engage valve 444. The valve 444 includes a valve bore 446 in which is slidably disposed a valve spool 448 having spaced equal diameter lands 450 and 452. The valve spool 448 is urged leftward, as viewed in FIG. 1c, by a spring 454. A portion of the valve land 452 has a flat 456 formed thereon such that fluid pressure can be communicated with the left end of valve spool 448. The passage 358 is in fluid communication with the valve bore 446 between valve lands 450 and 452. The fluid pressure entering valve bore 446 from passage 358 exits to a low ratio feed passage 458 which is connected to the shuttle valve 246. The pressure in passage 458 also communicates past flat 456 with the end of valve spool 448. The pressure operating on the end of valve spool 448 urges the valve spool rightward against valve spring 454 to restrict the fluid communication between passages 358 and 458. Thus, the valve 444 provides a reduced pressure which is operable in passage 458. When passage 358 is exhausted, a rapid exhausting of passage 458 is provided through a ball check 460.

The shuttle valve 246, as previously mentioned, is connected to the reverse apply passage 232. The shuttle valve 246 is also connected to a low-reverse apply passage 462 which in turn is connected to the apply piston for the brake 74. If either passage 458 or 232 is pressurized, the low-reverse apply passage 462 will be pressurized such that the brake 74 will be engaged. Since the reaction loading in low gear is less than reaction loading in reverse, less apply pressure is provided for the brake 74 by the low ratio engage valve 444 during low ratio operation while full line pressure is available during reverse operation.

The TV modulator valve 190 includes a stepped diameter bore 464 in which is slidably disposed a valve spool 466. The valve spool 466 has a pair of lands 468 and 470 with 470 being smaller. The valve spool 466 is urged leftward, as viewed in FIG. 1b, by a spring 472. In the spring set position shown, the space between lands 470 and 468 is connected to the MTV Up passage 362 which is also connected to the end of land 470. The end of land 468 is connected to the TV passage 180 which is subjected to fluid pressure generated at the throttle valve 162. Until the pressure in passage 180 is sufficient to overcome the force in spring 472, the pressure in passage 362 will be connected to exhaust and therefore the bias pressures at the 1-2 shift valve 250, 2-3 shift valve 244, 3-4 shift valve 242 and converter clutch shift valve 260 will be equal to exhaust when these valves are in their downshifted positions. Thus, the pressure bias preventing upshifting will be zero at this time.

When the pressure in passage 180 increases sufficiently to overcome the force in spring 472, the valve spool 466 will be moved sufficiently to regulate the pressure in passage 362. The regulated pressure in passage 362 is operable on the end of land 470 and since this area is less than the area of land 468, the regulated pressure in MTV Up passage 362 will increase more rapidly than the rate of increase of pressure in passage 180. Therefore, at low throttle pressures, the MTV Up pressure will be zero, while at higher throttle pressures the pressure in MTV Up passage 362 will be equal to the pressure in passage 180. In a specific application, it has been found that it is desirable to maintain the pressure in passage 362 equal to exhaust until TV pressure is 6 psi and to have the pressure in passage 362 equal to the pressure in passage 180 at 25 psi. Thus, in such a system, when the throttle valve does not generate a pressure above 6 psi, upshifting of the shift valves will result in governor pressure operating against the spring. This, of course, will provide a fixed speed at which the valves will upshift.

The specific upshift point for each valve will be determined by the spring and the area upon which the governor pressure operates. Thus, the upshift points are movable along the speed axis by simply changing the spring preload. The minimum throttle at which the vehicle speed upshifts occur is controlled by simply changing the spring 472 in the TV modulator valve 190. Therefore, it is readily apparent that the shift thresholds are determined by the springs. This reduces the number of components necessary to provide calibrations for various transmission and engine combinations since it is not necessary to adjust the diameters on the spool valves to change the shift point.

The TV modulator valve 192 is similar in design to the valve 190 and includes a stepped valve bore 474 in which is slidably disposed a valve spool 476. The valve spool is urged leftward, as viewed in FIG. 1b, by a spring 478. The valve spool 476 has a pair of spaced lands 480 and 482 with 482 being the smaller. The space between lands 480 and 482, in the spring set position, is in fluid communication with passage 390 and with an exhaust passage. The passage 390 is also connected to the end of valve land 482. The end of valve land 480 is in fluid communication with the pressure in passage 180. As explained above for valve 190, the pressure in MTV DWN passage 390 will be equal to exhaust until the pressure in passage 180 is raised sufficiently to overcome the force of spring 478 and move the valve spool 476 rightward to open controlled communication with passage 390. Since the area of land 482 is less than the area of land 480, the pressure in passage 390 will increase at a faster rate than the pressure in passage 180 increases after the valve has reached its controlling position. In one specific application, it has been found that having the valve 192 opening at 39 psi in passage 180 and having equal pressures between passage 180 and 390 at 67 psi is adequate.

As discussed above, when the shift valves 242, 244 and 260 are in their respective upshifted positions, the bias pressure for urging them to their downshifted position is provided in passage 390. In most applications, it has been found that the downshift bias on the 1-2 shift valve is not desirable. After the 2-3 shift valve 244 or 3-4 shift valve 242 or converter clutch shift valve 260 has been upshifted, a downshift bias pressure will not be active on these valves below the threshold level set by spring 478. Thus, at throttle settings below this threshold level, downshifting will occur depending on governor pressure and the spring bias in each of the respective shift valves. Thus, for a given throttle range, downshifting will be speed-sensitive only. The throttle range in which this speed-sensitive downshifting occurs will be controlled by the preload of spring 478 while the vehicle speed at which the speed responsive downshift occurs will be determined by the spring in the shift valve being operated. Thus, again, the shift thresholds are controlled by the spring members and can be readily adjusted such that a variety of shift calibrations can be obtained simply by interchanging the springs.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic control for a multispeed transmission adapted to be driven by a throttle controlled engine, said hydraulic control comprising; shift valve means movable between upshifted and downshifted positions for controlling the speed ratio in the transmission including upshift pressure chamber means, downshift pressure chamber means, and downshift bias spring means; speed responsive pressure means for supplying an upshift bias to said upshift pressure chamber means; throttle position responsive pressure means for supplying a pressure which varies when the engine throttle position varies; first modulator pressure valve means in fluid communication between said throttle position responsive pressure means and said downshift pressure chamber means for supplying a variable bias pressure to said downshift pressure chamber means when the pressure of the throttle position responsive pressure means is above a first predetermined level and said shift valve means is in the downshifted position; and second modulator pressure valve means in fluid communication between said throttle position responsive pressure means and said downshift pressure chamber means for supplying a bias pressure to said downshift pressure chamber means when the pressure of the throttle position pressure responsive means is above a second predetermined level, which is higher than said first predetermined level and, said shift valve means is in the upshifted position, the difference between said first and second predetermined pressure levels providing a downshift hysteresis for said shift valve at the shift point, said shift valve means being upshifted by the speed responsive pressure means in said upshift pressure chamber means when the pressure of said speed responsive pressure means is sufficient to overcome said downshift spring means and when the pressure of the throttle position responsive pressure means is below said first predetermined level whereby a constant speed upshift point is provided.

* * * * *